Nov. 9, 1926.  
W. L. KLASERNER  
ANGLER'S FLOAT  
Filed July 28, 1924
1,606,240
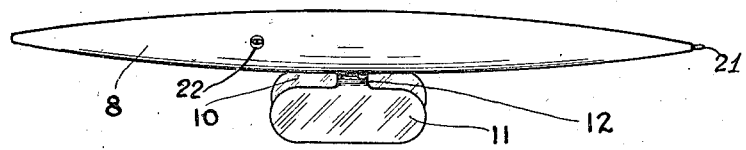
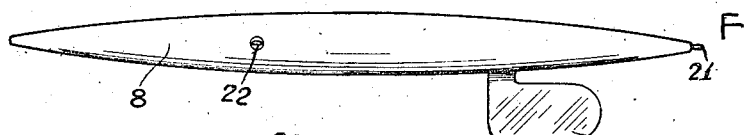
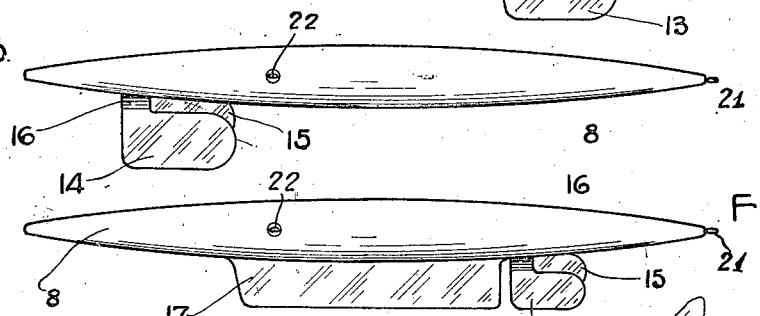
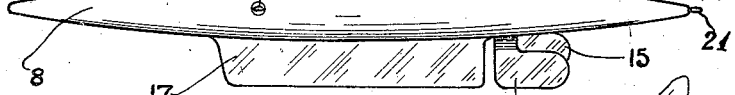
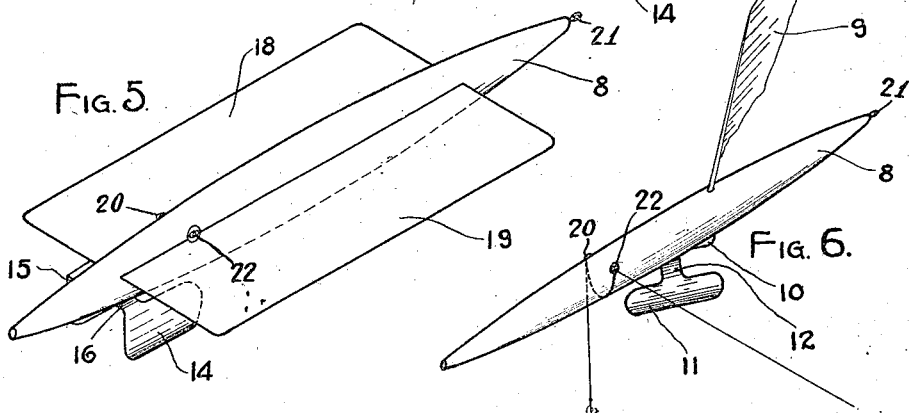
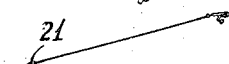
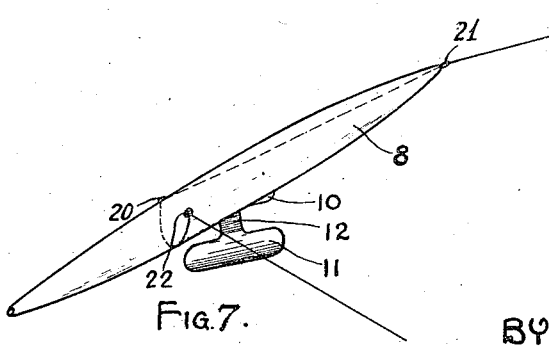
INVENTOR  
William L. Klaserner  
BY Thornton Bogert  
ATTORNEY Patented Nov. 9, 1926.

1,606,240

UNITED STATES PATENT OFFICE.

WILLIAM LEONIDAS KLASERNER, OF BROMLEY, KENTUCKY, ASSIGNOR OF ONE-HALF TO WILLIAM J. DAVIES, OF NEWPORT, KENTUCKY.

ANGLER'S FLOAT.

Application filed July 28, 1924. Serial No. 728,626.

Heretofore the use of a float in fishing has been attended with some difficulty. One of the principal difficulties has been in the trouble experienced in being able to get the float far enough to the opposite shore or to make it stay in midstream without washing ashore. Another difficulty has been in being able to cast in the presence of overhanging trees or other obstructions which render casting impossible. These are but two of several difficulties encountered in anglers' floats as heretofore used.

The float which I have described herein and shown in the drawing has for an object to overcome the several objections to floats known heretofore, by producing a float which will take the bait to midstream instead of allowing it to wash to shore, which will maintain the bait in midstream position, which will permit the use of artificial or live bait or of both simultaneously.

A further object is to produce an improved float in which the usual vertical position of the float of conventional shape has been changed to one in which the axis is horizontal with relation to the surface of the water, in order to secure directional effects, the advantages of which will be more fully set forth hereinafter.

These and other objects are attained in the float described in the following specification and illustrated in the accompanying drawing, in which;

Fig. 1 is a side view of a float embodying a desirable form of my invention.

Fig. 2 is a side view of a modified form of my invention.

Figs. 3 and 4 are side views of additionally modified forms of my invention.

Fig. 5 is a perspective view of another modified form of my invention.

Figs. 6 and 7 are perspective views of the manner of using my improved float, Fig. 6 showing a slight additional feature which will be described.

The general shape which I have found to be desirable in my improved float is that of an elongated torpedo-like body structure 8 of relatively light and buoyant material which will float upon the surface of the water and have sufficient buoyancy to support the weight of any sinkers or other tackle which may be used, without causing it to become submerged to the extent of destroying its visibility. The color of the body may be such as to render it clearly distinguishable, as is to be found in the usual float, and in order that it may be rendered still more visible, a vane, such as the feather 9, may be affixed to the upper surface. To the under side of the body I attach a rudder-like element which may occupy any suitable position along its length, and which may be of any suitable form.

In Fig. 1 the rudder takes the form of a double blade having the elements 10 and 11 which are held in spaced relation by a bar 12. The rudder is attached to the body by a screw passed through this bar and into the body so that frictional adjustment of the rudder to different angular positions is possible, as will be hereinafter explained.

The form of rudder shown in Fig. 2 is for accomplishing the same purpose as that just described, but the construction contains but a single blade 13. However the manner of mounting it is the same as that employed in the previously described construction so that frictional adjustment is possible. I have shown the mounting at the rear of the float.

Fig. 3 shows the rudder located at the front of the float and of double bladed type having the forward portions of the blades 14 and 15 connected by a bar 16 which is frictionally pivoted to the float body at its forward end.

In Fig. 4 the form of rudder shown in Fig. 3 is employed, but is located at the rear of the body, and in addition thereto a keel 17 is employed.

Fig. 5 discloses a still further modified form of float, which is identical with that shown in Fig. 3, but which has as an added feature two substantially horizontally disposed stabilizing planes 18 and 19 which will operate to prevent rocking or upsetting of the float.

The floats shown in Figs. 6 and 7 illustrate the form shown in Fig. 1, merely in order to show two ways in which attachment of the line and bait is accomplished, which holds good for any form of my improved float, although they are but two of several attachments which are possible. Fig. 7 is a line hook-up or attachment which is preferably employed for live bait and that shown in Fig. 6 is preferably employed for artificial bait.

Although I have shown several forms of my improved float, I have endeavored to develop the salient principles which are involved by showing that the float consists essentially of two principal features. One of these features lies in the position occupied by the float when in use, with its major axis lying in a plane which is substantially parallel with the surface of the water. This is a distinction from the usual float having its major axis in a plane at a substantial right angle with the water surface when it is in use. The other feature lies in the dirigibility of the float to cause it to function in bringing it to the desired position in the stream without effort on the part of the fisherman, and to maintain its position without substantial variation. This is accomplished, as I have demonstrated, regardless of the direction of flow, regardless of the side of the stream on which the fisherman is located and regardless of the position of trees, foliage, or other obstructions which may be present to prevent the usual casting methods employed. In fact it is but necessary to secure the float to the line by eyelets 20, 21, and 22 in some such manner as I have shown, then to adjust the position of the blades and merely drop the float and attached bait in the water. The current of the stream will carry the float to the position desired in the stream, it being merely necessary to allow the line to be fed out from the reel until the position is reached. While the float will naturally tend to travel down stream during its movement from the shore, the final position is one in which the line will be at an angle from the shore, slightly less than a right angle in the down stream direction. In this position it will be maintained indefinitely. Various other uses, as in trolling, will be apparent to the angler as he becomes more familiar with the operation of the float.

Having thus described my invention what I claim is:

1. An angler's float consisting of a body having a major axis, a direction guiding blade attached to the body for frictional adjustment thereon at an angle to the major axis of the body, and line attaching means on the body adapted to maintain the body in relatively fixed position with its guiding blade held in current impinging position relatively to the stream.

2. An angler's float consisting of a body having a major axis, means adapted to attach the body to the line in a manner such that the float will lie with its major axis substantially in a plane parallel with the water surface, and a direction guiding blade attached to the body for frictional adjustment thereon to bring its surface in current impinging position at an angle to the major axis of the body and relatively to the stream, whereby the body will be maintained in a position with its major axis substantially parallel with the direction of flow of the stream.

In testimony whereof I have hereunto affixed my signature.

WILLIAM LEONIDAS KLASERNER.